United States Patent
Onishi et al.

(10) Patent No.: US 9,095,880 B2
(45) Date of Patent: Aug. 4, 2015

(54) OSCILLATOR

(75) Inventors: Yasuharu Onishi, Tokyo (JP); Jun Kuroda, Tokyo (JP); Motoyoshi Komoda, Tokyo (JP); Yuichiro Kishinami, Tokyo (JP); Yukio Murata, Tokyo (JP); Shigeo Satou, Tokyo (JP); Tatsuya Uchikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 13/695,454

(22) PCT Filed: Jun. 17, 2011

(86) PCT No.: PCT/JP2011/003480
§ 371 (c)(1),
(2), (4) Date: Oct. 31, 2012

(87) PCT Pub. No.: WO2012/001901
PCT Pub. Date: Jan. 5, 2012

(65) Prior Publication Data
US 2013/0043769 A1      Feb. 21, 2013

(30) Foreign Application Priority Data
Jun. 30, 2010    (JP) .................................. 2010-149919

(51) Int. Cl.
*H01L 41/053*     (2006.01)
*B06B 1/06*       (2006.01)
(Continued)

(52) U.S. Cl.
CPC .............. *B06B 1/0648* (2013.01); *G06F 3/016* (2013.01); *H04R 17/00* (2013.01); *H04R 7/10* (2013.01); *H04R 2217/03* (2013.01); *H04R 2499/11* (2013.01)

(58) Field of Classification Search
CPC .... B06B 1/0622; G10K 11/02; H01L 41/053; H01L 41/107
USPC .................................................. 310/334, 345
See application file for complete search history.

(56) References Cited

U.S. PATENT DOCUMENTS 5,802,196 A  *  9/1998  Nakamura ..................... 381/423
6,127,770 A  *  10/2000 Hauser et al. ................. 310/338
(Continued)

FOREIGN PATENT DOCUMENTS

CN          101336562 A         12/2008
EP          0480045 A1          4/1992
(Continued)

OTHER PUBLICATIONS

English Translation of JP 06-269092.*
(Continued)

*Primary Examiner* — Derek Rosenau
*Assistant Examiner* — Bryan Gordon
(74) *Attorney, Agent, or Firm* — Sughrue Mion, PLLC

(57) ABSTRACT

An oscillator includes a piezoelectric vibrator (10), a vibrating member (20) which is larger than the piezoelectric vibrator (10) when seen in a plan view and restrains one surface of the piezoelectric vibrator (10), a vibrating member (25) which is larger than the piezoelectric vibrator (10) when seen in a plan view and restrains the other surface of the piezoelectric vibrator (10), an elastic member (30) which supports an edge of the surface of the vibrating member (20), which restrains the piezoelectric vibrator (10), and supports an edge of the surface of the vibrating member (25), which restrains the piezoelectric vibrator (10), and a supporting member (35) which is located around the elastic member (30) and supports the elastic member (30).

6 Claims, 4 Drawing Sheets

(51) Int. Cl.
 *G06F 3/01* (2006.01)
 *H04R 17/00* (2006.01)
 *H04R 7/10* (2006.01)

(56) References Cited

U.S. PATENT DOCUMENTS

2004/0207797 A1* 10/2004 Sakurada .................. 349/153
2010/0038998 A1* 2/2010 Onishi et al. ............. 310/334
2010/0165050 A1* 7/2010 Morikoshi ................ 347/54
2010/0219722 A1* 9/2010 Onishi et al. ............. 310/348

FOREIGN PATENT DOCUMENTS

| | | | |
|---|---|---|---|
| JP | 57-128300 U | 8/1982 | |
| JP | 60-112397 A | 6/1985 | |
| JP | 1-109781 A | 4/1989 | |
| JP | 6-269092 A | 9/1994 | |
| JP | 2001-339793 A | 12/2001 | |
| JP | 2002-152888 A | 5/2002 | |
| WO | 2007/083497 A1 | 7/2007 | |

OTHER PUBLICATIONS

Communication dated Oct. 10, 2014 from the State Intellectual Property Office of the People's Republic of China in counterpart Chinese Patent Application No. 201180027655.2.

* cited by examiner

OSCILLATOR

CROSS REFERENCE TO RELATATED APPLICATIONS

This application is a National Stage of International Application No. PCT/JP2011/003480 filed Jun. 17, 2011, claiming priority based on Japanese Patent Application No. 2010-149919, filed Jun. 30, 2010, the contents of all of which are incorporated herein by reference in their entirety.

TECHNICAL FIELD

The present invention relates to an oscillator using a piezoelectric vibrator.

BACKGROUND ART

As an electroacoustic transducer of a mobile device or the like, there is an electro-dynamic electroacoustic transducer. The electro-dynamic electroacoustic transducer generates oscillation amplitude by using the action of a magnetic circuit. However, since the magnetic circuit is constituted by a large number of members such as permanent magnets or voice coils, in the electro-dynamic electroacoustic transducer, there is a limit to reduction of thickness.

As an electroacoustic transducer to replace the electro-dynamic electroacoustic transducer, there is a piezoelectric-type electroacoustic transducer. The piezoelectric-type electroacoustic transducer generates oscillation amplitude by using expansion and contraction motion which is generated by applying an electric field to a piezoelectric vibrator. Since the piezoelectric-type electroacoustic transducer does not need a large number of members in order to generate the oscillation amplitude, the piezoelectric-type electroacoustic transducer has an advantage in reduction of thickness.

As techniques relating to the piezoelectric vibrator, there are techniques described in Patent Documents 1 to 5. The techniques described in Patent Documents 1 and 2 are techniques in which a vibrating member with a piezoelectric vibrator attached thereto is supported by a supporting member through an elastic member. In Patent Document 3, there is disclosed a piezoelectric acoustic device in which the density of members which are connected in sequence from a piezoelectric element in the peripheral direction thereof is gradually decreased. In Patent Document 4, there is disclosed a wave-receiving type piezoelectric element in which a piezoelectric vibrator is sandwiched between a pair of rigid members. The technique described in Patent Document 5 is a technique in which a cut groove is provided in a piezoelectric vibrator which is constituted by fixing a piezoelectric element between two vibrating plates through solder.

RELATED DOCUMENT

Patent Document

[Patent Document 1] WO 2007/083497 A1
[Patent Document 2] Japanese Laid-open patent publication NO. 2002-152888
[Patent Document 3] Japanese Laid-open patent publication NO. 2001-339793
[Patent Document 4] Japanese Laid-open patent publication NO. H6-269092
[Patent Document 5] Japanese Laid-open patent publication NO. S60-112397

DISCLOSURE OF THE INVENTION

A piezoelectric material constituting a piezoelectric vibrator is a brittle material and has a small mechanical loss. For this reason, the piezoelectric-type electroacoustic transducer has a high mechanical quality factor (a Q value) in contrast with the electro-dynamic electroacoustic transducer. Therefore, the electro-dynamic electroacoustic transducer generates piston type amplitude motion, whereas the piezoelectric-type electroacoustic transducer generates flexion type amplitude motion. Therefore, in the piezoelectric-type electroacoustic transducer, the amount of displacement at an edge of a vibration is smaller than that in the electro-dynamic electroacoustic transducer, and the piezoelectric-type electroacoustic transducer has a disadvantage in a sweep volume in amplitude. Therefore, an oscillator using a piezoelectric vibrator, in which a sufficient sound pressure level can be realized by securing a sweep volume in amplitude while attaining a reduction in size, is required.

An object of the present invention is to provide an oscillator using a piezoelectric vibrator, in which a high sound pressure level can be realized while attaining a reduction in size.

According to the invention, there is provided an oscillator including: a piezoelectric vibrator; a first vibrating member which is larger than the piezoelectric vibrator when seen in a plan view and restrains one surface of the piezoelectric vibrator; a second vibrating member which is larger than the piezoelectric vibrator when seen in a plan view and restrains the other surface of the piezoelectric vibrator; an elastic member which supports an edge of a surface of the first vibrating member, which restrains the piezoelectric vibrator, and supports an edge of a surface of the second vibrating member, which restrains the piezoelectric vibrator; and a supporting member which is located around the elastic member and supports the elastic member.

According to the invention, an oscillator using a piezoelectric vibrator, in which a high sound pressure level can be realized while attaining a reduction in size, can be provided.

BRIEF DESCRIPTION OF THE DRAWINGS

The foregoing and other objects, features, and advantages will become more apparent from preferred embodiments described below and the following drawings associated therewith.

DESCRIPTION OF EMBODIMENTS

Figure 1:
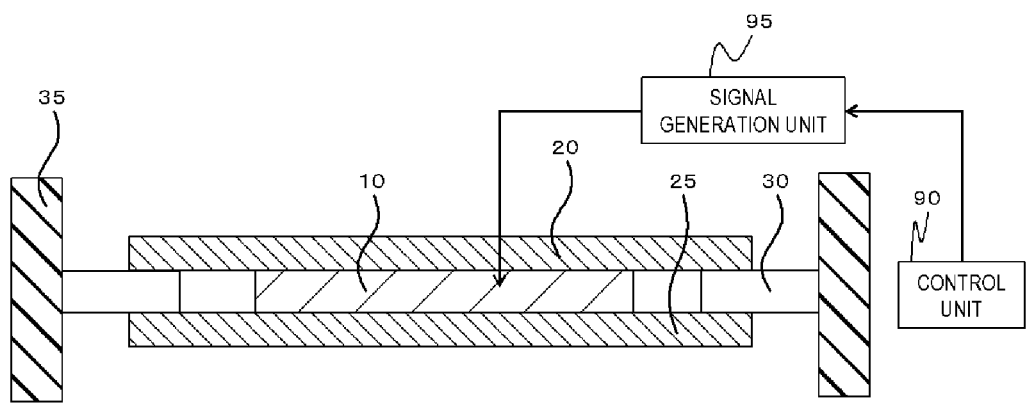
FIG. 1 is a cross-sectional view illustrating an oscillator related to a first embodiment.

Hereinafter, embodiments of the invention will be described using the drawings. In addition, in all the drawings, the same component is denoted by the same reference numeral and description will not be repeated.

FIG. 1 is a cross-sectional view illustrating an oscillator 100 related to a first embodiment. The oscillator 100 includes a piezoelectric vibrator 10, a vibrating member 20, a vibrating member 25, an elastic member 30, and a supporting member 35. The oscillator 100 is used as, for example, a loudspeaker or an oscillation source of a sound wave sensor. Further, the oscillator 100 can also function as a temperature sensor by using the pyroelectric effect of a piezoelectric body. In a case of using the oscillator 100 as a loudspeaker, it can be used as a sound source of electronic equipment (a mobile phone, a laptop computer, small game equipment, or the like), for example.

The vibrating member 20 is larger than the piezoelectric vibrator 10 when seen in a plan view. Further, the vibrating member 20 restrains one surface of the piezoelectric vibrator 10. The vibrating member 25 is larger than the piezoelectric vibrator 10 when seen in a plan view. Further, the vibrating member 25 restrains the other surface of the piezoelectric vibrator 10. The elastic member 30 supports an edge of the surface of the vibrating member 20, which restrains the piezoelectric vibrator 10. In addition, the elastic member 30 supports an edge of the surface of the vibrating member 25, which restrains the piezoelectric vibrator 10. The supporting member 35 is located around the elastic member 30 and supports the elastic member 30. Hereinafter, the configuration of the oscillator 100 will be described in detail using FIGS. 1 and 2.

As illustrated in FIG. 1, in the oscillator 100, a structure which is constituted by the piezoelectric vibrator 10, the vibrating member 20, the vibrating member 25, and the elastic member 30 is plane-symmetrical in the central plane in the thickness direction of the elastic member 30. Further, the oscillator 100 includes a control unit 90 and a signal generation unit 95. The signal generation unit 95 generates an electric signal which is input to the piezoelectric vibrator 10. The control unit 90 controls the signal generation unit 95 on the basis of information input from the outside. In a case of using the oscillator 100 as a loudspeaker, information which is input to the control unit 90 is an audio signal. Further, in a case of using the oscillator 100 as a sound wave sensor, a signal which is input to the control unit 90 is a command signal to the effect of oscillating sound waves. Then, in a case of using the oscillator 100 as a sound wave sensor, the signal generation unit 95 makes the piezoelectric vibrator 10 generate sound waves having the resonant frequency of the piezoelectric vibrator 10.

Further, in a case where the piezoelectric vibrator 10, the vibrating member 20, the vibrating member 25, and the elastic member 30 are provided in a plurality of sets, the oscillator 100 can be used as a parametric speaker. In this case, the control unit 90 inputs a modulating signal as the parametric speaker through the signal generation unit 95. In a case of using the oscillator 100 as the parametric speaker, the piezoelectric vibrator 10 uses a sound wave of 20 kHz or more, for example, 100 kHz as a signal transport wave.

Figure 2:
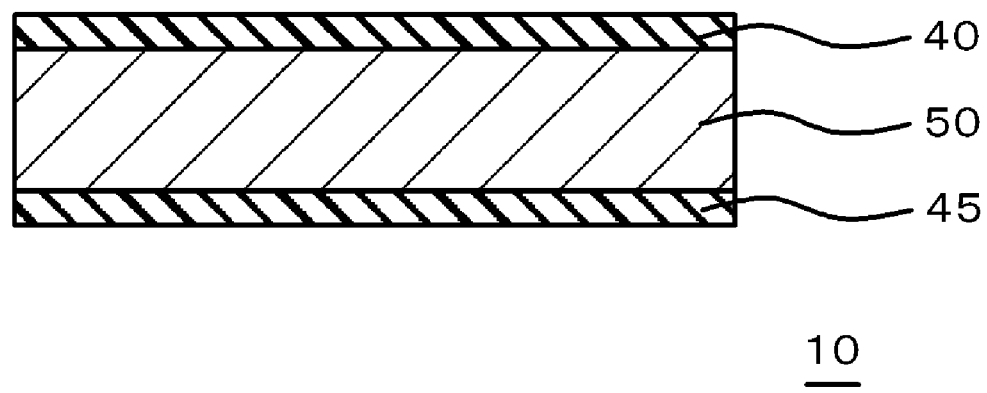
FIG. 2 is a cross-sectional view illustrating a piezoelectric vibrator illustrated in FIG. 1.

FIG. 2 is a cross-sectional view illustrating the piezoelectric vibrator 10 illustrated in FIG. 1. As illustrated in FIG. 2, the piezoelectric vibrator 10 includes an upper electrode 40, a lower electrode 45, and a piezoelectric body 50. Further, the piezoelectric vibrator 10 has, for example, a circular shape, an elliptic shape, or a rectangular shape. The piezoelectric vibrator 10 has the same thickness as that of, for example, the elastic member 30. The piezoelectric body 50 is sandwiched between the upper electrode 40 and the lower electrode 45. The piezoelectric body 50 is formed of a material having a piezoelectric effect and formed of, for example, lead zirconate titanate (PZT), barium titanate ($BaTiO_3$), or the like. Further, it is preferable that the thickness of the piezoelectric body 50 be in a range of 10 μm to 1 mm. In a case where the thickness is less than 10 μm, since the piezoelectric body 50 is formed of a brittle material, breakage or the like easily occurs. On the other hand, in a case where the thickness exceeds 1 mm, the electric field strength of the piezoelectric body 50 is reduced, thereby resulting in a decrease in energy conversion efficiency.

The upper electrode 40 and the lower electrode 45 are formed of, for example, silver, silver/palladium alloy, or the like. It is preferable that the thickness of each of the upper electrode 40 and the lower electrode 45 be in a range of 1 μm to 50 μm. In a case where the thickness is less than 1 μm, it becomes difficult to uniformly mold the electrodes. On the other hand, in a case where the thickness exceeds 100 μm, the upper electrode 40 or the lower electrode 45 becomes a restraint surface for the piezoelectric body 50, thereby causing a decrease in energy conversion efficiency.

The piezoelectric vibrator 10 in this embodiment is restrained at both surfaces thereof by the vibrating members 20 and 25. Each of the vibrating members 20 and 25 has a function to propagate vibration generated by the piezoelectric vibrator 10 to the elastic member 30. Further, each of the vibrating members 20 and 25 has a function to improve the mechanical strength of the oscillator 100. Each of the vibrating members 20 and 25 is formed of a material having high elastic modulus with respect to a ceramic material and formed of, for example, phosphor bronze, stainless steel, or the like. It is preferable that the thickness of each of the vibrating members 20 and 25 be in a range of 5 μm to 500 μm. Further, it is preferable that the longitudinal elastic modulus of each of the vibrating members 20 and 25 be in a range of 1 GPa to 500 GPa. In a case where the longitudinal elastic modulus of each of the vibrating members 20 and 25 is excessively low or high, there is a concern that characteristics or reliability as a mechanical vibrator may be impaired.

The elastic member 30 is formed of, for example, a resin material such as urethane, PET, or polyethylene, or the like. The vibrating members 20 and 25 are supported by the supporting member 35 through the elastic member 30. Therefore, the elastic member 30 has a function to make an edge of vibration of the oscillator 100 free to a certain degree, rather than a fixed edge. Further, the elastic member 30 has a function to improve the mechanical strength of the oscillator 100, such as absorption of impact energy at the time of dropping. It is preferable that the rigidity of the elastic member 30 be less than or equal to 1/50 of the rigidity of each of the vibrating members 20 and 25. The supporting member 35 is constituted by, for example, a metal film such as stainless steel.

Next, a method of manufacturing the oscillator 100 related to this embodiment will be described. First, the piezoelectric body 50 is manufactured. The manufacturing of the piezoelectric body 50 is performed by a green sheet method and is subjected to firing for 2 hours at 1100° C. in air. Subsequently, the upper electrode 40 and the lower electrode 45 are formed on the piezoelectric body 50. Then, the piezoelectric body 50 is subjected to polarization treatment in the thickness direction. The piezoelectric vibrator 10 obtained in this way is bonded to the vibrating members 20 and 25 by using epoxy-based resin or the like. At the same time, the elastic member 30 is bonded to the vibrating members 20 and 25. Then, the elastic member 30 is supported by the supporting member 35. In this way, the oscillator 100 is formed.

The piezoelectric body 50 can be made to have an outer diameter of φ15 mm and a thickness of 100 μm. The piezoelectric body 50 can be formed using lead zirconate titanate-based ceramic. Each of the upper electrode 40 and the lower electrode 45 can be made to have a thickness of 8 μm. Each of the upper electrode 40 and the lower electrode 45 can be formed using silver/palladium alloy (weight ratio 70%:30%). Each of the vibrating members 20 and 25 can be made to have an outer diameter of φ16 mm and a thickness of 100 μm. Each of the vibrating members 20 and 25 can be formed using phosphor bronze. The elastic member 30 can be made to be a hollow shape having an outer diameter of ϕ18 mm and an inner diameter of ϕ15 mm and have a thickness of 100 μm. The supporting member 35 can constitute a hollow case having an outer diameter of ϕ19 mm and an inner diameter of ϕ18 mm. The supporting member 35 can be formed using Next, a sound reproduction method by a piezoelectric-type electroacoustic transducer using the oscillator 100 related to this embodiment will be described. In this embodiment, sound reproduction can be performed by using the operating principle of, for example, a parametric speaker. In this case, the control unit 90 inputs a modulating signal as the parametric speaker to the piezoelectric vibrator 10 through the signal generation unit 95. In a case of using the oscillator 100 as the parametric speaker, the piezoelectric vibrator 10 uses a sound wave of 20 kHz or more, for example, 100 kHz as a signal transport wave.

Here, the operating principle of the parametric speaker will be described. The operating principle of the parametric speaker is to perform sound reproduction on the principle that ultrasonic waves subjected to AM modulation, DSB modulation, SSB modulation, or FM modulation are radiated into the air and an audible sound is generated due to non-linear characteristics when the ultrasonic waves propagate into the air. The term "non-linear" as referred to herein means that if the Reynolds number, which is expressed by the ratio between the inertial action and the viscous action of the flow, becomes large, the flow transitions from laminar flow to turbulent flow. That is, since a sound wave is minutely disturbed in a fluid, the sound wave propagates non-linearly. In particular, in a case where an ultrasonic wave is radiated into the air, higher harmonics due to non-linearity are generated significantly. Further, a sound wave is in rarefied and dense states where molecular groups in the air are mixed in dense and rarefied fashions. In a case where it takes time for air molecules to perform restoration rather than compression, air unable to perform restoration after compression collides with air molecules propagating continuously, whereby shock waves are generated, and thus an audible sound is generated.

Next, the effects of this embodiment will be described. In the oscillator 100, the vibrating members 20 and 25 are supported by the supporting member 35 through the elastic member 30. For this reason, an edge of vibration becomes free. Therefore, a sweep volume in amplitude becomes large. Further, the energy of the piezoelectric vibrator 10 is propagated to the elastic member 30 through the vibrating members 20 and 25. For this reason, matching of the mechanical impedance of the oscillator is attained, and thus vibration propagation efficiency is improved. Further, the inventors have found that amplitude is increased in the oscillator 100 having the configuration in this embodiment. This is assumed to be due to the fact that a symmetric property in the central plane of vibration is generated in the oscillator 100 by sandwiching the piezoelectric vibrator 10 between the vibrating members 20 and 25. Therefore, a high sound pressure level can be realized while attaining a reduction in size.

Further, in a case where the rigidity of the elastic member 30 is 1/50 of the rigidity of each of the vibrating members 20 and 25, amplitude is further increased. Therefore, in this case, a higher sound pressure level can be realized. Further, the piezoelectric vibrator 10 is supported by the supporting member 35 through the elastic member 30. Therefore, the impact stability of the oscillator can be improved. Further, the piezoelectric vibrator 10 is sandwiched between the vibrating members 20 and 25 each formed of a metal material. Therefore, it is not necessary to directly connect an interconnection to the piezoelectric vibrator 10, and thus ease of manufacturing of the oscillator is improved.

Figure 3:
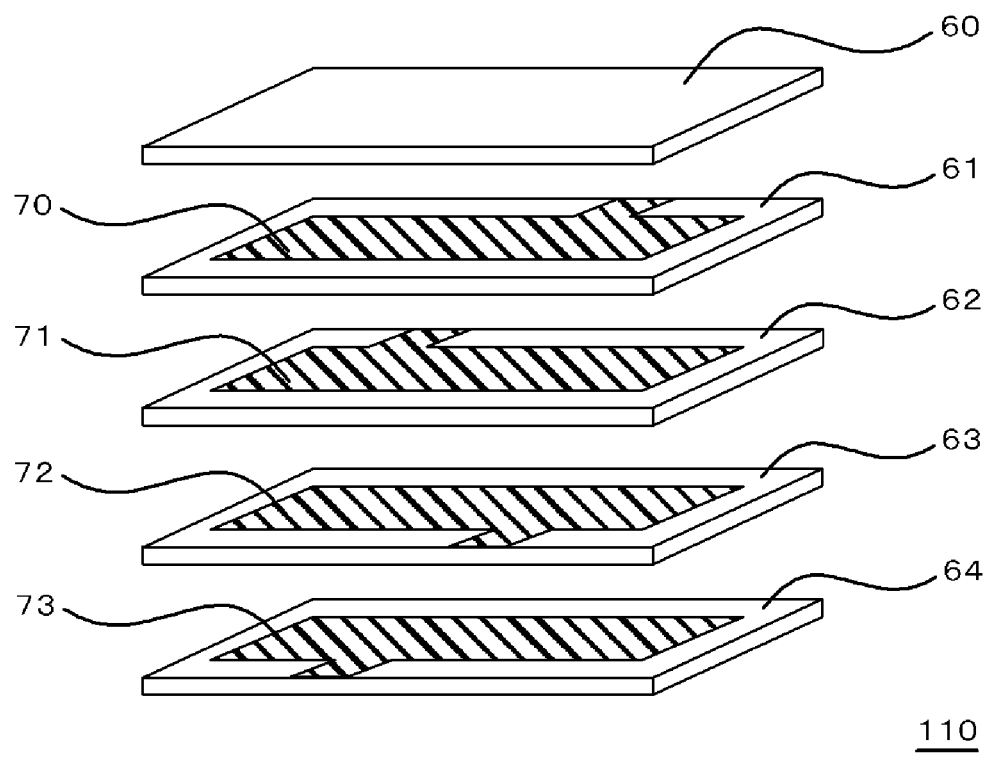
FIG. 3 is a perspective view illustrating a piezoelectric vibrator related to a second embodiment.

FIG. 3 is a perspective view illustrating a piezoelectric vibrator 110 related to a second embodiment.

An oscillator related to this embodiment is the same as the oscillator 100 related to the first embodiment except for the configuration of the piezoelectric vibrator. Further, the piezoelectric vibrator 110 related to this embodiment is the same as the piezoelectric vibrator 10 related to the first embodiment with the exception of having a laminated structure.

As illustrated in FIG. 3, the piezoelectric vibrator 110 is constituted by alternately laminating a plurality of piezoelectric bodies and a plurality of electrodes. Electrodes 70, 71, 72, and 73 are formed by one layer between piezoelectric bodies 60, 61, 62, 63, and 64. The electrodes 70 and 72 and the electrodes 71 and 73 are respectively connected to each other. The direction of polarization of each piezoelectric body is reverse for each layer. Further, the directions of electric fields which are generated between the respective electrodes are also alternately reverse.

Also in this embodiment, the same effects as those in the first embodiment can be obtained. Further, since the piezoelectric vibrator 110 has a laminated structure, electric field strength which is generated between electrode layers is high. In this way, the driving force of the piezoelectric vibrator 110 can be improved. In addition, the number of laminated layers of the piezoelectric vibrator 110 can be increased or decreased arbitrarily.

EXAMPLES

The oscillators illustrated in FIGS. 1 and 3 were fabricated and the characteristics of each oscillator were examined (Examples 1 and 2). In these examples, the oscillators functioned as parametric speakers. Further, as a comparative example, an electro-dynamic oscillator having the same plane area as those in Examples 1 and 2 was fabricated and the characteristics thereof were examined. The results are shown in Table 1. In addition, in the measurement of a sound pressure level frequency characteristic, a sound pressure level at the time of input of alternating-current voltage of 1 V was measured by a microphone disposed at a position 10 cm distant from the piezoelectric vibrator. Further, in the measurement of drop impact stability, a mobile communication terminal on which an electroacoustic transducer provided with the oscillator is mounted was free-fallen five times from a height of 50 cm. Thereafter, breakage or the like of the mobile communication terminal was visually confirmed. In addition, a sound pressure characteristic was measured and a case where a difference in sound pressure level before and after a test is not more than 3 dB was indicated by ○.

TABLE 1

|  | Comparative example | Example 1 | Example 2 |
| --- | --- | --- | --- |
| Sound pressure level (1 KHz) | 77 dB | 90 dB | 90 dB |
| Sound pressure level (3 KHz) | 75 dB | 87 dB | 89 dB |
| Sound pressure level (5 KHz) | 76 dB | 86 dB | 91 dB |
| Sound pressure level (10 KHz) | 97 dB | 88 dB | 89 dB |
| Drop impact stability | x | ○ | ○ |

From this table, it is found that in the oscillator related to each example, compared to the comparative example, the sound pressure level is high. Further, it is also found that compared to the comparative example, the drop impact stability is high.

Figure 4:
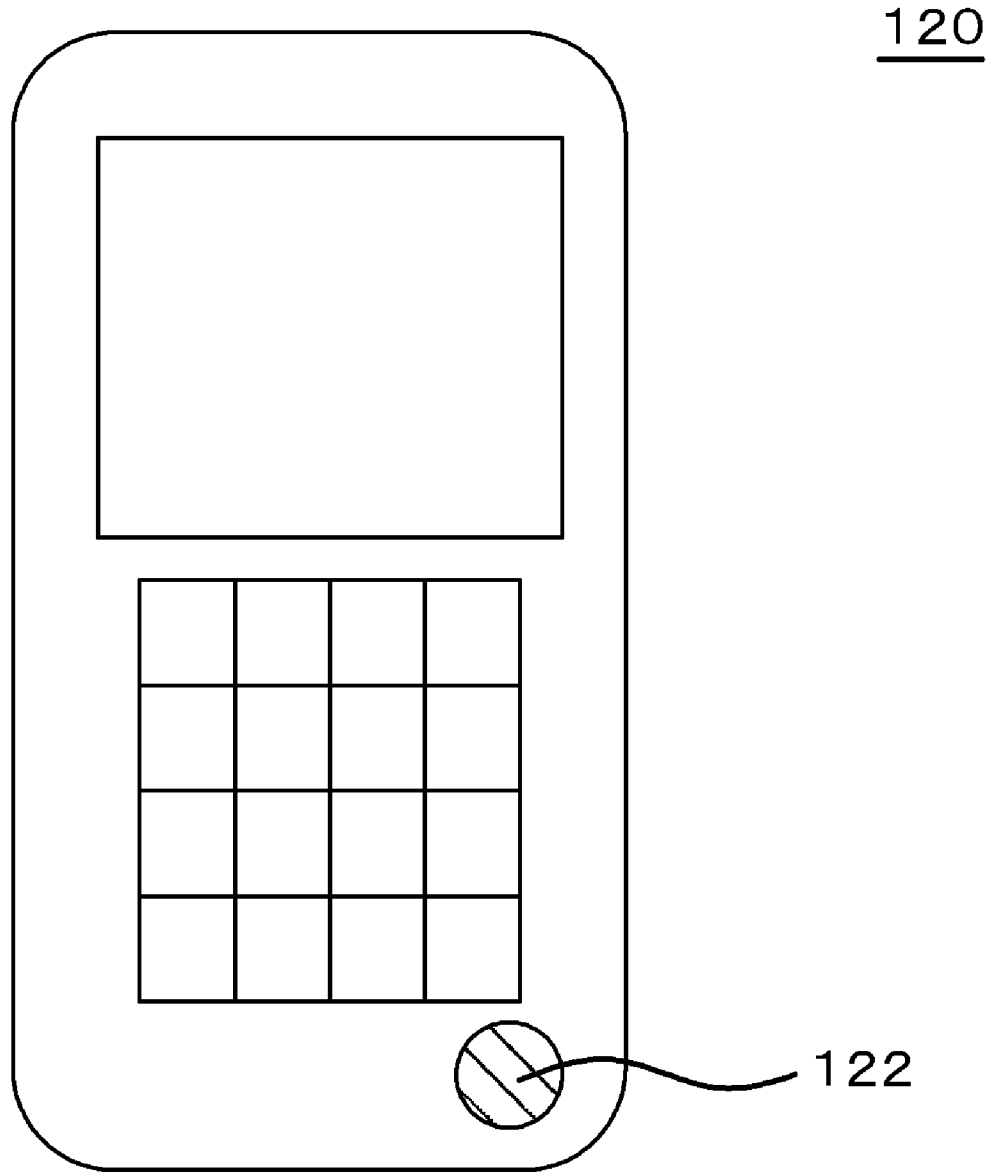
FIG. 4 is a schematic diagram illustrating the configuration of a mobile communication terminal.

Further, as illustrated in FIG. 4, as a loudspeaker 122 of a mobile communication terminal 120, the oscillators related to Examples 1 and 2 were used. The loudspeaker 122 was mounted on the inner surface of a casing of the mobile communication terminal 120. The characteristics of the loudspeaker 122 in a case of using each example are shown in Table 2. In addition, the measurement conditions are the same as those in Table 1.

TABLE 2

|  | Example 1 | Example 2 |
|---|---|---|
| Sound pressure level (1 KHz) | 91 dB | 90 dB |
| Sound pressure level (3 KHz) | 89 dB | 89 dB |
| Sound pressure level (5 KHz) | 89 dB | 90 dB |
| Sound pressure level (10 KHz) | 91 dB | 91 dB |
| Drop impact stability | ○ | ○ |

From this table, it is found that the mobile communication terminal 120 related to each example secures a high sound pressure level. Further, it is also found that the drop impact stability is high.

The embodiments of the invention have been described above with reference to the drawings. However, these are exemplification of the invention and various configurations other than those described above can also be adopted.

This application claims the right of priority based on Japanese Patent Application No. 2010-149919 filed on Jun. 30, 2010, the entire contents of which are incorporated herein by reference.

The invention claimed is:

1. An oscillator comprising:
a piezoelectric vibrator;
a first vibrating member which is larger than the piezoelectric vibrator when seen in a plan view and restrains one surface of the piezoelectric vibrator;
a second vibrating member which is larger than the piezoelectric vibrator when seen in a plan view and restrains the other surface of the piezoelectric vibrator;
an elastic member which supports an edge of a surface of the first vibrating member, which restrains the piezoelectric vibrator, and supports an edge of a surface of the second vibrating member, which restrains the piezoelectric vibrator; and
a supporting member which is located around the elastic member and supports the elastic member,
wherein a first surface of the elastic member is in contact with the surface of the first vibrating member which restrains the piezoelectric vibrator, and a second surface of the elastic member opposite to the first surface is in contact with the surface of the second vibrating member which restrains the piezoelectric vibrator.

2. The oscillator according to claim 1, wherein the rigidity of the elastic member is less than or equal to $1/50$ of the rigidity of each of the first vibrating member and the second vibrating member.

3. The oscillator according to claim 1, wherein the elastic member is constituted by a resin material.

4. The oscillator according to claim 1, wherein a structure which is constituted by the piezoelectric vibrator, the first vibrating member, the second vibrating member, and the elastic member is plane-symmetrical in the central plane in the thickness direction of the elastic member.

5. The oscillator according to claim 1, wherein the oscillator is an oscillation source of a sound wave sensor.

6. The oscillator according to claim 1, wherein the oscillator is a loudspeaker.

* * * * *

UNITED STATES PATENT AND TRADEMARK OFFICE
CERTIFICATE OF CORRECTION

| | | |
|---|---|---|
| PATENT NO. | : 9,095,880 B2 | Page 1 of 1 |
| APPLICATION NO. | : 13/695454 | |
| DATED | : August 4, 2015 | |
| INVENTOR(S) | : Yasuharu Onishi et al. | |

It is certified that error appears in the above-identified patent and that said Letters Patent is hereby corrected as shown below:

Specification

Column 1, Line 3: Delete "RELATATED" and insert -- RELATED --.

Column 5, Line 7: After "using" insert -- SUS304. --.

Column 6, Line 5: Delete "An oscillator....structure." and insert the same on Col. 6, Line 4 as a same paragraph.

Signed and Sealed this
Nineteenth Day of January, 2016

Michelle K. Lee
*Director of the United States Patent and Trademark Office*